US012487624B2

(12) United States Patent
Sathe

(10) Patent No.: US 12,487,624 B2
(45) Date of Patent: Dec. 2, 2025

(54) POWER MANAGEMENT METHOD

(71) Applicant: University of Washington, Seattle, WA (US)

(72) Inventor: Visvesh S. Sathe, Seattle, WA (US)

(73) Assignee: University of Washington, Seattle, WA (US)

( * ) Notice: Subject to any disclaimer, the term of this patent is extended or adjusted under 35 U.S.C. 154(b) by 213 days.

(21) Appl. No.: 18/047,790

(22) Filed: Oct. 19, 2022

(65) Prior Publication Data

US 2024/0134405 A1 Apr. 25, 2024
US 2024/0231406 A9 Jul. 11, 2024

(51) Int. Cl.
*G05F 1/625* (2006.01)

(52) U.S. Cl.
CPC .................................... *G05F 1/625* (2013.01)

(58) Field of Classification Search
CPC ..... G05F 3/02; G05F 3/30; G05F 3/22; G05F 3/222; G05F 3/242; G05F 3/225; G05F 3/245; G05F 3/20; G05F 3/00; G05F 3/08; G05F 3/10; G05F 3/16; G05F 3/18; G05F 3/185; G05F 3/227; G05F 3/247; G05F 3/26; G05F 3/265; G05F 3/24262; G05F 3/24; G05F 3/262
See application file for complete search history.

(56) References Cited

U.S. PATENT DOCUMENTS

2023/0409104 A1* 12/2023 Lyakhov .................. G06F 1/28

OTHER PUBLICATIONS

Bowman K.A., Raina S., Bridges J.T., Yingling D.J., Ngyuen H.H., Appel B.R., Kolla Y.N., Jeong J, Atallah F.I., Hansquine D.W. “A 16 nm All-Digital Auto-Calibrating Adaptive Clock Distribution for Supply Voltage Droop Tolerance Across a Wide Operating Range”. IEEE J. Solid-State Circuits, vol. 51, No. 1, Jan. 2016.
Sun X., Rahman F.U., Pamula V.R., Kim S., Li X., John N., Sathe V.S. “An All-Digital Fused PLL-Buck Architecture for 82% Average Vdd-Margin Reduction in a 0.6-to-1.0-V Cortex-M0 Processor”. IEEE J. Solid-State Circuits, vol. 54, No. 11, Nov. 2019.
Wilcox K., Cole R., Fair III H.R., Gillespie K., Grenat A., Henrion C., Jotwani R., Kosonocky S., Munger B., Naffziger S., Orefice R.S., Pant S., Priore D.A., Rachala R., White J. “Steamroller Module and Adaptive Clocking System in 28 nm CMOS”. IEEE J. Solid-State Circuits, vol. 50, No. 1., Jan. 2015.

* cited by examiner

*Primary Examiner* — Bryan R Perez
(74) *Attorney, Agent, or Firm* — McDonnell Boehnen Hulbert & Berghoff LLP

(57) ABSTRACT

A control circuit includes one or more processors and a computer readable medium storing instructions that, when executed by the one or more processors, cause the control circuit to perform functions. The functions include providing a load current that flows into a digital load and determining a magnitude of a difference between a load voltage across the digital load and a reference voltage. The functions also includes determining a digital state of the digital load and adjusting the load current based on (i) the magnitude of the difference between the load voltage and the reference voltage and (ii) the digital state of the digital load.

19 Claims, 6 Drawing Sheets

POWER MANAGEMENT METHOD

BACKGROUND

Digital circuits that use adaptive clocking can experience slowed performance as a result of compensating for voltage droop. Voltage droop typically occurs when a digital circuit is demanding a high level of current. Voltage droop can be detected and corrected via closed loop feedback. Additionally, such circuits generally reduce clock frequency in response to detecting the voltage droop. Reducing the clock frequency generally causes the clock period to remain longer than the critical path delay of the digital circuit. However, such control methods generally do not prevent voltage droop, they merely correct it after it occurs.

SUMMARY

A first example includes a method comprising: providing a load current that flows into a digital load; determining a magnitude of a difference between a load voltage across the digital load and a reference voltage; determining a digital state of the digital load; and adjusting the load current based on (i) the magnitude of the difference between the load voltage and the reference voltage and (ii) the digital state of the digital load.

A second example includes a non-transitory computer readable medium storing instructions that, when executed by a control circuit, cause the control circuit to perform functions comprising: providing a load current that flows into a digital load; determining a magnitude of a difference between a load voltage across the digital load and a reference voltage; determining a digital state of the digital load; and adjusting the load current based on (i) the magnitude of the difference between the load voltage and the reference voltage and (ii) the digital state of the digital load.

A third example includes a control circuit comprising: one or more processors; and a computer readable medium storing instructions that, when executed by the one or more processors, cause the control circuit to perform functions comprising: providing a load current that flows into a digital load; determining a magnitude of a difference between a load voltage across the digital load and a reference voltage; determining a digital state of the digital load; and adjusting the load current based on (i) the magnitude of the difference between the load voltage and the reference voltage and (ii) the digital state of the digital load.

When the term "substantially" or "about" is used herein, it is meant that the recited characteristic, parameter, or value need not be achieved exactly, but that deviations or variations, including, for example, tolerances, measurement error, measurement accuracy limitations, and other factors known to those of skill in the art may occur in amounts that do not preclude the effect the characteristic was intended to provide. In some examples disclosed herein, "substantially" or "about" means within +/−0-5% of the recited value.

These, as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible.

DETAILED DESCRIPTION

As discussed above, control circuits and methods for more quickly compensating for the effects of voltage droop are needed. To this end, a method includes providing a load current that flows into a digital load. In some examples, the digital load is a microprocessor. The method also includes determining a magnitude of a difference between a load voltage across the digital load and a reference voltage (e.g., 1.0 V) and determining a digital state of the digital load. The digital state of the digital load can include the digital states of various hardware components of the digital load. Determining the digital states of the hardware components can include determining operations (if any) currently being performed or scheduled to be performed by the hardware components, determining whether the hardware components currently have access to the data necessary to perform the operations, and/or accessing metadata that indicates an anticipated change in the load current caused by executing an operation in the instruction queue of the digital load. The method also includes adjusting the load current based on (i) the magnitude of the difference between the load voltage and the reference voltage and (ii) the digital state of the digital load. For example, the control circuit can adjust the load current based on the magnitude of the difference between the load voltage and the reference voltage periodically at a first sampling rate, and adjust the load current based on the digital state of the digital load at a second sampling rate that is greater than or equal to the first sampling rate. In this way, the control circuit adjusts the load current being provided to the digital load by estimating current and/or future demands the digital load has or will have for the load current. The control circuit also adjusts the load current, generally at a slower rate, in response to detected deviations of the load voltage from the reference voltage.

Figure 1:
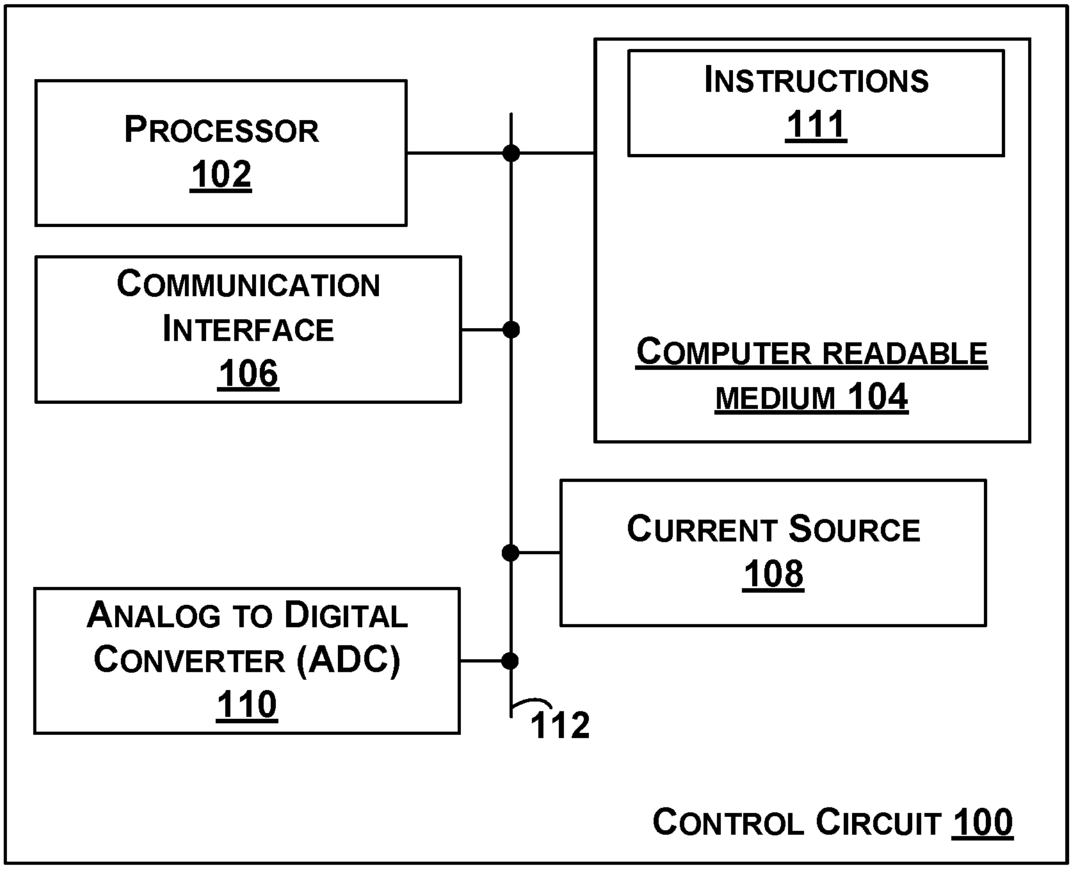
FIG. 1 is a block diagram of a control circuit, according to an example.

FIG. 1 is a block diagram of a control circuit 100. The control circuit 100 includes one or more processors 102, a non-transitory computer readable medium 104, a communication interface 106, a current source 108, and an analog to digital converter (ADC) 110. Components of the control circuit 100 are linked together by a system bus, network, or other connection mechanism 112.

The one or more processors 102 can be any type of processor(s), such as a microprocessor, a field programmable gate array, a digital signal processor, a multicore processor, etc., coupled to the non-transitory computer readable medium 104.

The non-transitory computer readable medium 104 can be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the non-transitory computer readable medium 104 stores instructions 111. The instructions 111 are executable by the one or more processors 102 to cause the control circuit 100 to perform any of the functions or methods described herein.

The communication interface 106 can include hardware to enable communication within the control circuit 100 and/or between the control circuit 100 and one or more other devices. The hardware can include any type of input and/or output interfaces, a universal serial bus (USB), PCI Express, transmitters, receivers, and antennas, for example. The communication interface 106 can be configured to facilitate communication with one or more other devices, in accordance with one or more wired or wireless communication protocols. For example, the communication interface 106 can be configured to facilitate wireless data communication for the control circuit 100 according to one or more wireless communication standards, such as one or more Institute of Electrical and Electronics Engineers (IEEE) 801.11 standards, ZigBee standards, Bluetooth standards, etc. As another example, the communication interface 106 can be configured to facilitate wired data communication with one or more other devices. The communication interface 106 can also include analog-to-digital converters (ADCs) or digital-to-analog converters (DACs) that the control circuit 100 can use to control various components of the control circuit 100 or external devices.

The current source 108 can include any circuit configured to generate an electrical current having a magnitude that is controlled by an input control signal.

The ADC 110 is configured to generate a digital signal representation of an analog input signal.

Figure 2:
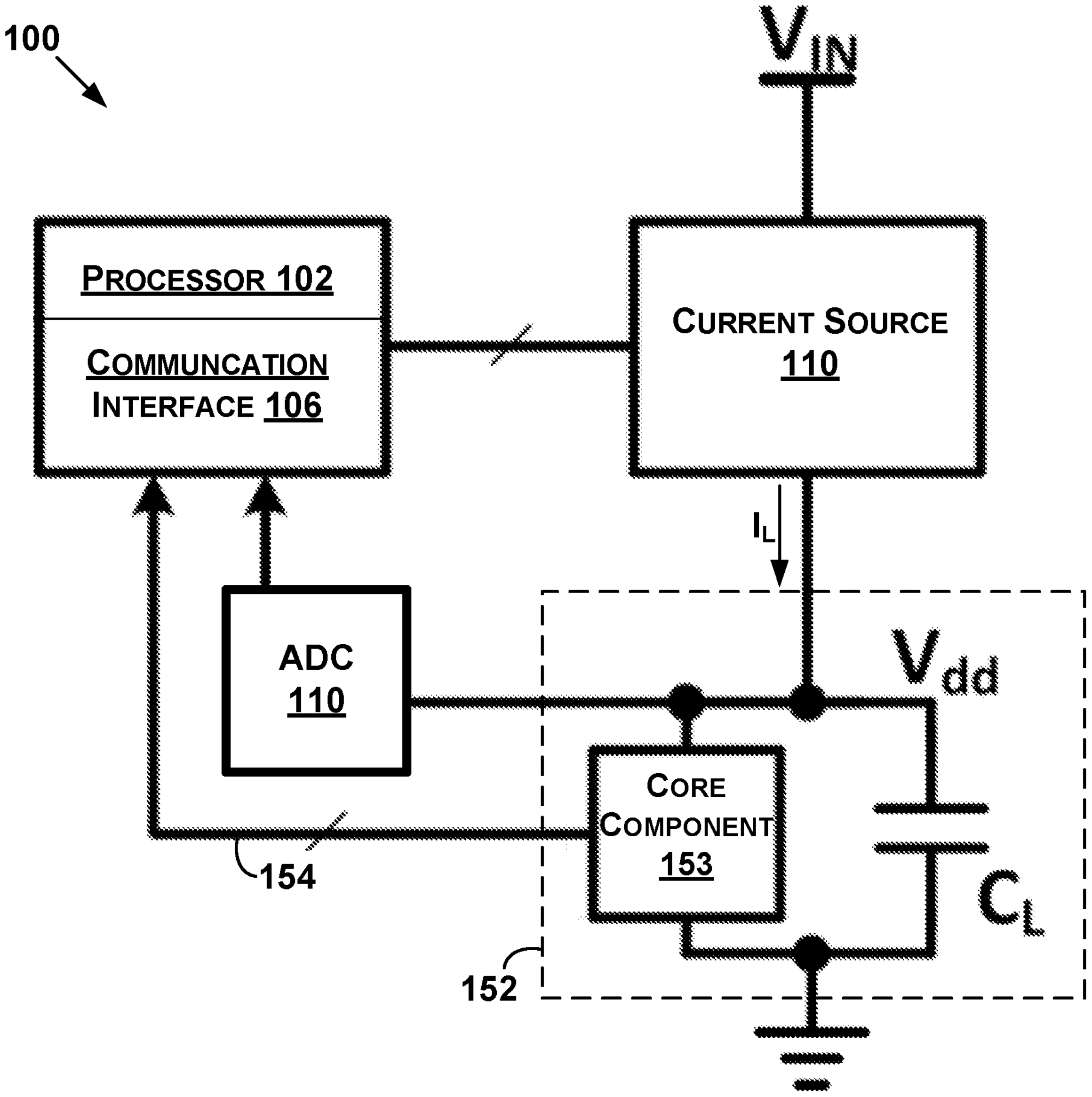
FIG. 2 is a schematic diagram of a control circuit and a digital load, according to an example.

FIG. 2 is a schematic diagram of the control circuit 100 and a digital load 152. The control circuit 100 provides a load current $I_L$ that flows into the digital load 152. In the example of FIG. 2, the current source 108 of the control circuit 100 provides the load current $I_L$. The digital load 152 can take the form of a microprocessor, a field programmable gate array, a digital signal processor, a multicore processor, or any other synchronous digital load, but other examples are possible. The digital load 152 can be modeled as a core component 153 and a load capacitance $C_L$ that are connected in parallel. The load capacitance $C_L$ can be extrinsic, intrinsic, or a combination of both.

The control circuit 100 also determines a magnitude and/or a polarity of a difference between a load voltage $V_{dd}$ across the digital load 152 and a reference voltage. The load voltage $V_{dd}$ can vary based on the digital state of the digital load 152 and/or the load current $I_L$ being provided by the current source 108. That is, the digital load 152 can draw varying magnitudes of the load current $I_L$ based on the quantity and type of state transitions and/or switching that is occurring at the transistor level of the digital load 152. In this way, the digital load 152 can exhibit transient changes in overall resistance that affects the magnitude of the load current $I_L$ and/or the load voltage $V_{dd}$. The reference voltage could be within a range of 0.9 volts (V) to 1.3 V, for example, 1.0 V. As such, the control circuit 100 (e.g., periodically and/or continuously) determines a magnitude and/or a polarity of the difference between the load voltage $V_{dd}$ and the reference voltage.

More specifically, the ADC 110 receives and/or samples the load voltage $V_{dd}$ and provides the load voltage $V_{dd}$ to the one or more processors 102 in a digital form. The one or more processors 102 uses the digital form to determine the magnitude and/or polarity of the difference between the load voltage $V_{dd}$ and the reference voltage.

The control circuit 100 also determines the digital state of the digital load 152, for example, in a periodic and/or continuous manner. More specifically, the control circuit 100 receives digital signals 154 from the digital load 152 and uses the digital signals 154 to determine digital states of a plurality of hardware components of the digital load 152. Such hardware components could include one or more of a floating point multiplier, a floating point adder, a floating point divider, an integer multiplier, an integer adder, an integer divider, a shift register, a filter, an FFT module, a logic circuit, or a memory module, but other examples are possible.

The control circuit 100 determining the digital states of the plurality of hardware components can involve identifying one or more operations currently being performed by the digital load, that is, identifying one or more operations currently being performed by the plurality of hardware components. The digital signals 154 can identify the hardware components of the digital load 152 that are currently performing operations and identify the operations. For example, the digital signals 154 could include information from an instruction queue of the digital load 152 that explicitly or implicitly identifies the hardware components and identifies the operations the hardware components are currently performing. For instance, the digital signals 154 could indicate that current operations of the digital load 152 include a floating point multiplier performing floating point multiplication and an integer adder performing integer addition. The digital signals 154 could be expressed as one or more numerical ratings (e.g., current values) representing anticipated current demands corresponding to each operation currently being performed by the digital load 152, with the sum of such current demands contributing to an estimated value of the load current $I_L$ that is imminently anticipated.

In addition to considering operations currently being performed by the digital load 152, the control circuit 100 can also evaluate operations that the digital load 152 is scheduled to perform in the future in determining the digital state of the digital load 152. For example, the control circuit 100 determines one or more operations scheduled to be performed by the digital load 152 in the future based on accessing the instruction queue for the digital load 152. In this way, the control circuit 100 can anticipate future current demands of the digital load 152 and adjust the load current $I_L$ accordingly. Thus, the digital signals 154 could be expressed as one or more numerical ratings representing anticipated current demands corresponding to each operation scheduled to be performed by the digital load 152, with the sum of such current demands contributing to an estimated value of the load current $I_L$ that is anticipated in the future.

Additionally or alternatively, the digital signals 154 can indicate whether the digital load 152 has access to the data necessary to perform the operations scheduled via the instruction queue. Depending on the content of the digital signals 154, the control circuit 100 can determine that the digital load 152 has access to the data (e.g., operands) necessary to perform a scheduled operation and that the digital load 152 therefore is ready to perform the scheduled operation and adjust the load current $I_L$ accordingly. In another scenario, the control circuit 100 can determine that the digital load 152 is waiting to receive the data necessary to perform a scheduled operation and delay an adjustment of the load current $I_L$ that corresponds to the scheduled operation.

Additionally or alternatively, the control circuit 100 can determine the digital state of the digital load 152 based on accessing metadata that explicitly indicates an anticipated change in the load current $I_L$ caused by executing an operation listed in the instruction queue. For example, the instruction queue of the digital load 152 can include metadata corresponding to each scheduled instruction that explicitly indicates the anticipated change in the load current $I_L$ caused by executing that particular operation.

The control circuit 100 can compute a sum of the digital states of the plurality of hardware components to determine the overall digital state of the digital load 152. For example, the control circuit 100 can add (a) the components of the digital states of the plurality of hardware components that correspond to operations currently being executed by the plurality of hardware components to (b) the components of the digital states of the plurality of hardware components that correspond to operations scheduled to be performed by the plurality of hardware components. Each component of the digital states can be numerically weighted according to its contribution to present or anticipated demand for the load current $I_L$. As such, control circuit 100 can adjust the load current $I_L$ with a change equal to the sum of the digital states (e.g., current demands) of the plurality of hardware components.

As such, the control circuit 100 adjusts the load current $I_L$ based on (i) the magnitude of the difference between the load voltage $V_{dd}$ and the reference voltage and (ii) the digital state of the digital load 152. For example, the communication interface 106 provides a first control signal to the current source 108 representing a command to adjust the load current $I_L$ based on the difference between the load voltage $V_{dd}$ and the reference voltage. Additionally, the communication interface 106 provides a second control signal to the current source 108 representing a command to adjust the load current $I_L$ based on the digital state of the digital load 152. Accordingly, the current source 108 adjusts the load current $I_L$ based on the first control signal and adjusts the load current $I_L$ based on the second control signal.

In some examples, the current source 108 adjusts the load current $I_L$ such that the magnitude of the difference between the load voltage $V_{dd}$ and the reference voltage is reduced or substantially eliminated. For instance, the control circuit 100 can determine that the load voltage $V_{dd}$ is less than the reference voltage and responsively increase the load current $I_L$, which tends to increase the load voltage $V_{dd}$. For example, the degree of increase in the load current $I_L$ can be proportional to the difference between the load voltage $V_{dd}$ and the reference voltage. In other examples, proportional-integral (PI) or proportional-integral-differential (PID) control schemes can be used. Other examples are possible as well.

In another example, the control circuit 100 can determine that the load voltage $V_{dd}$ is greater than the reference voltage and responsively decrease the load current $I_L$, which tends to decrease the load voltage $V_{dd}$. For example, the degree of decrease in the load current $I_L$ can be proportional to the difference between the load voltage $V_{dd}$ and the reference voltage. In other examples, PI or PID control schemes can be used. Other examples are possible as well.

Typically, the control circuit 100 periodically determines the magnitude of the difference between the load voltage $V_{dd}$ and the reference voltage at a first sampling rate typically in the range of 10 MHz up to 1 GHz. The control circuit 100 also periodically determines the digital state of the digital load 152 at a second sampling rate that is greater than or equal to the first sampling rate. Typical ranges for the second sampling rate can vary within the range of 30 MHz to 3 GHz. As such, the control circuit 100 can adjust the load current $I_L$ based on the magnitude of the difference periodically at the first sampling rate and can adjust the load current $I_L$ based on the digital state of the digital load 152 at the second sampling rate.

Figure 3:
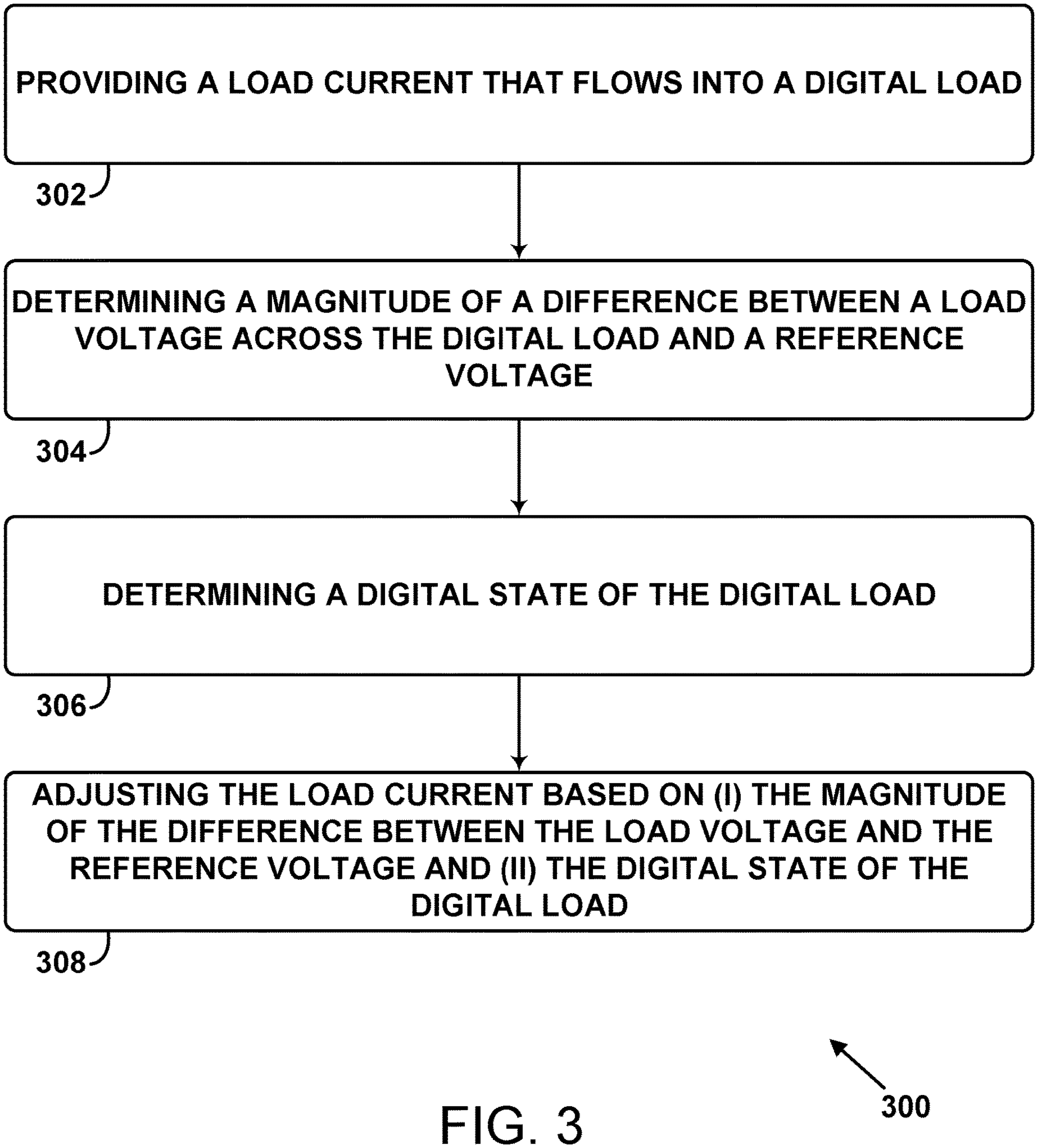
FIG. 3 is a block diagram of a method, according to an example.

FIG. 3 is a block diagram of a method 300 for the control circuit 100 providing the load current $I_L$ to the digital load 152. As shown in FIG. 3, the method 300 includes one or more operations, functions, or actions as illustrated by blocks 302, 304, 306, and 308. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 302, the method 300 includes the control circuit 100 providing the load current $I_L$ that flows into the digital load 152. Functionality related to block 302 is described above with reference to FIG. 2.

At block 304, the method 300 includes determining the magnitude of the difference between the load voltage $V_{dd}$ across the digital load 152 and the reference voltage. Functionality related to block 304 is described above with reference to FIG. 2.

At block 306, the method 300 includes determining the digital state of the digital load 152. Functionality related to block 306 is described above with reference to FIG. 2.

At block 308, the method 300 includes adjusting the load current $I_L$ based on (i) the magnitude of the difference between the load voltage $V_{dd}$ and the reference voltage and (ii) the digital state of the digital load 152. Functionality related to block 308 is described above with reference to FIG. 2.

Figure 4:
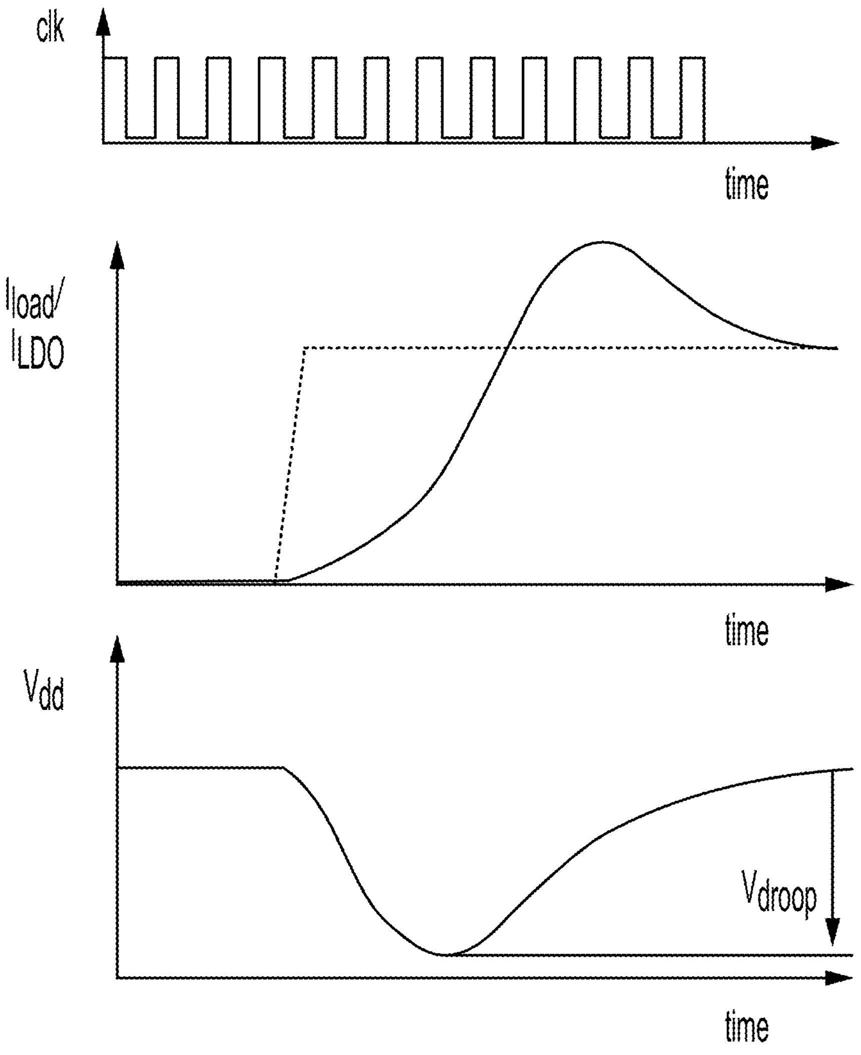
FIG. 4 shows a simulated performance of a conventional control circuit, according to an example.

FIG. 4 shows a simulated performance of a conventional control circuit. As shown, an abrupt stepwise increase in the load current $I_{load}$ provided to a digital load causes a substantial voltage droop $V_{droop}$ that lasts for a substantial duration of time before correction by the control circuit.

Figure 5:
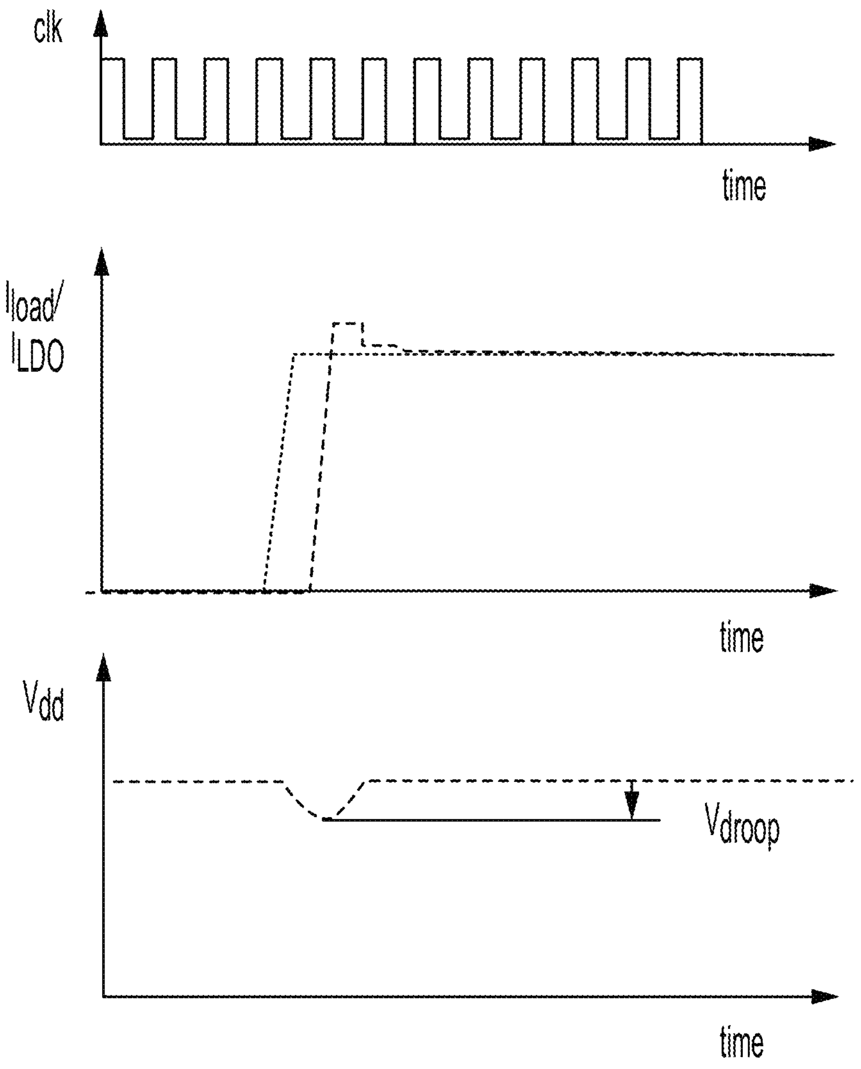
FIG. 5 shows a simulated performance of a control circuit of the disclosure, according to an example.

FIG. 5 shows a simulated performance of the control circuit 100. As shown, an abrupt stepwise increase in the load current $I_{load}$ provided to the digital load 152 causes a much smaller and quicker voltage droop $V_{droop}$.

Figure 6:
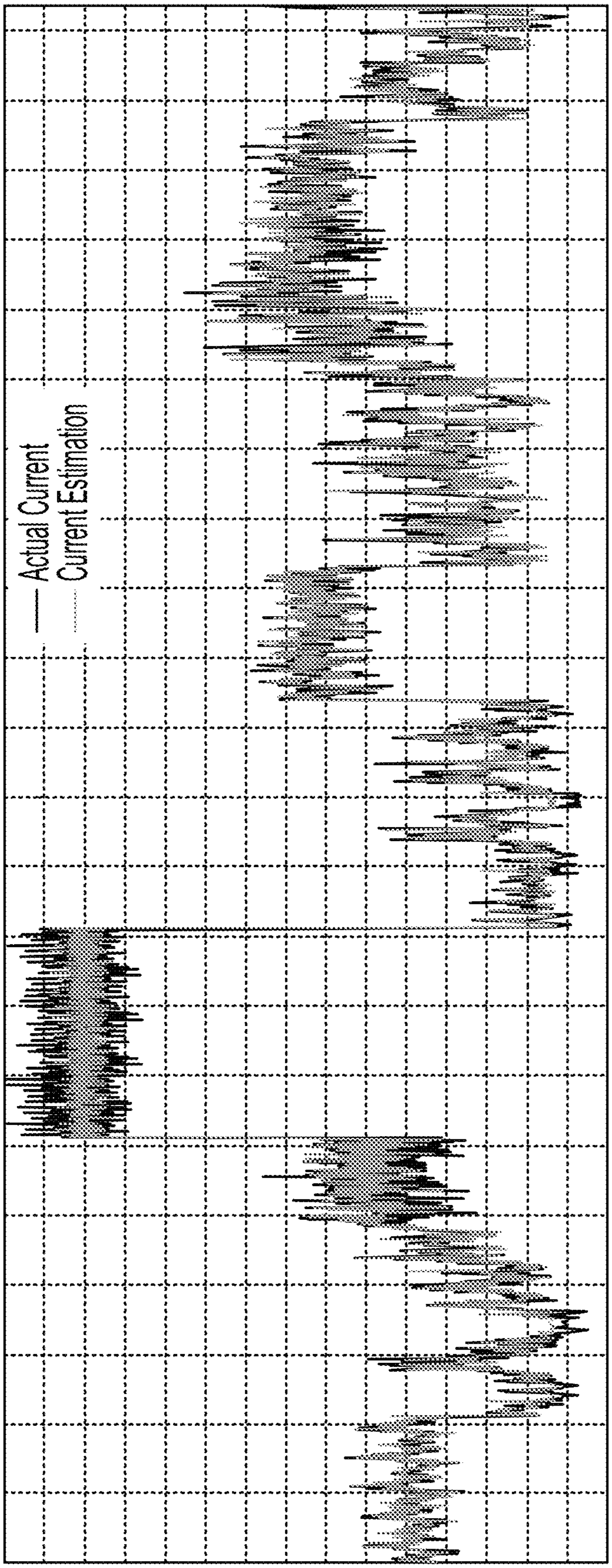
FIG. 6 shows actual and estimated currents dissipated by a processor, according to an example.

FIG. 6 shows actual and estimated currents drawn by a processor. More particularly, FIG. 6 shows that the techniques of using digital states of the digital load 152 as a proxy for present and future load current demands are effective in accurately determining present current demands and forecasting future current demands.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. A method comprising: providing a load current that flows into a digital load; detecting a load voltage across the digital load; determining a magnitude of a difference between the load voltage and a reference voltage; receiving digital signals from the digital load, wherein the digital signals indicate future demand for the load current by the digital load;

determining a digital state of the digital load using the digital signals, wherein determining the digital state of the digital load comprises determining, based on accessing an instruction queue for the digital load, an operation scheduled to be performed by the digital load; and adjusting the load current based on (i) the magnitude of the difference between the load voltage and the reference voltage and (ii) the digital state of the digital load.

2. The method of claim 1, wherein adjusting the load current comprises:

providing a first control signal to a current source, thereby causing the current source to adjust the load current based on the difference between the load voltage and the reference voltage; and providing a second control signal to the current source, thereby causing the current source to adjust the load current based on the digital state of the digital load.

3. The method of claim 1, wherein detecting the load voltage comprises an analog-to-digital converter sampling the load voltage and providing a digital representation of the load voltage to one or more processors, and receiving the digital signals comprises the one or more processors receiving the digital signals directly from the digital load.

4. The method of claim 1, wherein adjusting the load current comprises adjusting the load current such that the magnitude of the difference between the load voltage and the reference voltage is reduced.

5. The method of claim 1, further comprising determining that the load voltage is less than the reference voltage, wherein adjusting the load current comprises increasing the load current.

6. The method of claim 1, further comprising determining that the load voltage is greater than the reference voltage, wherein adjusting the load current comprises decreasing the load current.

7. The method of claim 1, wherein determining the magnitude of the difference comprises periodically determining the magnitude of the difference at a first sampling rate, wherein adjusting the load current based on the magnitude of the difference comprises periodically adjusting the load current at the first sampling rate, wherein determining the digital state of the digital load comprises periodically determining the digital state of the digital load at a second sampling rate that is greater than or equal to the first sampling rate, and wherein adjusting the load current based on the digital state of the digital load comprises periodically adjusting the load current at the second sampling rate.

8. The method of claim 1, wherein the digital load comprises a synchronous digital load.

9. The method of claim 1, wherein determining the digital state of the digital load comprises:

determining digital states of a plurality of hardware components of the digital load; and computing a sum of the digital states of the plurality of hardware components.

10. The method of claim 9, wherein computing the sum comprises computing a weighted sum of the digital states of the plurality of hardware components.

11. The method of claim 1, wherein determining the digital state of the digital load comprises determining a state of a floating point multiplier, a floating point adder, a floating point divider, an integer multiplier, an integer adder, an integer divider, a shift register, a filter, an FFT module, a logic circuit, or a memory module.

12. The method of claim 1, wherein determining the digital state of the digital load comprises identifying an operation currently being performed by the digital load.

13. The method of claim 1, wherein determining the digital state of the digital load further comprises determining whether data necessary for performing the operation is currently stored by the digital load.

14. The method of claim 1, wherein determining the digital state of the digital load further comprises accessing metadata that indicates an anticipated change in the load current caused by executing the operation listed in the instruction queue.

15. A control circuit comprising: one or more processors; and a non-transitory computer readable medium storing instructions that, when executed by the one or more processors, cause the control circuit to perform functions comprising: providing a load current that flows into a digital load; detecting a load voltage across the digital load; determining a magnitude of a difference between the load voltage and a reference voltage; receiving digital signals from the digital load, wherein the digital signals indicate future demand for the load current by the digital load;

determining a digital state of the digital load using the digital signals, wherein determining the digital state of the digital load comprises determining, based on accessing an instruction queue for the digital load, an operation scheduled to be performed by the digital load; and adjusting the load current based on (i) the magnitude of the difference between the load voltage and the reference voltage and (ii) the digital state of the digital load.

16. The control circuit of claim 15, further comprising a communication interface configured to generate a first control signal indicating a first adjustment of the load current based on the difference.

17. The control circuit of claim 16, wherein the communication interface is further configured to generate a second control signal indicating a second adjustment of the load current based on the digital state of the digital load.

18. The control circuit of claim 17, further comprising a current source configured to adjust the load current based on the first control signal and configured to adjust the load current based on the second control signal.

19. A non-transitory computer readable medium storing instructions that, when executed by a control circuit, cause the control circuit to perform functions comprising: providing a load current that flows into a digital load; detecting a load voltage across the digital load; determining a magnitude of a difference between the load voltage and a reference voltage; receiving digital signals from the digital load, wherein the digital signals indicate future demand for the load current by the digital load;

determining a digital state of the digital load using the digital signals, wherein determining the digital state of the digital load comprises determining, based on accessing an instruction queue for the digital load, an operation scheduled to be performed by the digital load; and adjusting the load current based on (i) the magnitude of the difference between the load voltage and the reference voltage and (ii) the digital state of the digital load.

* * * * *